United States Patent [19]

Delago

[11] Patent Number: 4,478,340

[45] Date of Patent: Oct. 23, 1984

[54] SWING BEARING QUICK REMOVAL SYSTEM

[75] Inventor: Pierre C. Delago, Afton, Minn.

[73] Assignee: American Hoist & Derrick Company, St. Paul, Minn.

[21] Appl. No.: 372,073

[22] Filed: Apr. 26, 1982

[51] Int. Cl.$^3$ ............................................. B66C 23/84
[52] U.S. Cl. .................................... 212/253; 212/175; 403/364
[58] Field of Search ......... 403/326, 341, 364, DIG. 7; 212/175, 179, 180, 253; 104/35, 40, 46; 74/813 R

[56] References Cited

U.S. PATENT DOCUMENTS

| | | | |
|---|---|---|---|
| 1,052,439 | 2/1913 | Crosby | 212/232 |
| 1,473,935 | 11/1923 | Horton | 212/253 |
| 2,553,220 | 5/1951 | Troeger | 403/364 |
| 2,710,763 | 6/1955 | Gilbert | 287/103 |
| 2,792,513 | 5/1957 | Rashevsky | 403/364 |
| 2,877,732 | 3/1959 | Eaton | 114/22 |
| 3,061,389 | 10/1962 | Bargmann | 308/221 |
| 3,521,911 | 7/1970 | Hanes et al. | 285/27 |
| 3,601,436 | 8/1971 | Jorgensen | 403/364 |
| 3,844,127 | 10/1974 | Koop, Jr. et al. | 403/165 |
| 3,888,357 | 6/1975 | Bauer et al. | 212/175 |
| 3,921,817 | 11/1975 | Petrik et al. | 212/66 |
| 3,923,407 | 12/1975 | Jensen et al. | 403/165 |

FOREIGN PATENT DOCUMENTS

| | | | |
|---|---|---|---|
| 697383 | 11/1979 | U.S.S.R. | 212/253 |
| 697387 | 11/1979 | U.S.S.R. | 212/253 |
| 767011 | 9/1980 | U.S.S.R. | 212/253 |

Primary Examiner—Trygve M. Blix
Assistant Examiner—Thomas J. Brahan
Attorney, Agent, or Firm—Kinney & Lange

[57] ABSTRACT

In a crane having an upper works rotatably supported on a lower works by an anti-friction bearing, a quick removal assembly structure includes an upper mounting ring affixed to the lowermost portion of the upper works and having teeth extending radially outwardly from the axis of the ring, a lower mounting ring mounted to the uppermost portion of the lower works and having teeth extending axially outwardly along a circle concentric with the center of that ring. The teeth of the upper and lower mounting rings fit snugly together when the upper works is assembled to the lower works, and radially outwardly opening horizontal slots in each tooth combine to define a horizontal retaining ring groove which is concentric with the rings. A retaining ring constituted as four retaining ring segments is of configuration to fit into the retaining ring groove, and when so fitted, prevents relative movement between the upper and lower mounting rings. Each end of each retaining ring segment integrally supports an end bracket, and a nut and bolt assembly is supported in each pair of adjacent end brackets. Shortening the effective length of each nut and bolt assembly causes the end brackets to move towards each other and firmly into the horizontal retaining ring groove. Retaining ring segment release means includes removable bolts threadably and horizontally mounted through provided openings in each of the retaining ring segments. Rotation of these bolts in inward direction forces the retaining ring segments out of the retaining ring groove. Retaining ring support arms extend outwardly from the teeth of one of the mounting rings to support the retaining ring segments when they are out of the retaining ring groove.

3 Claims, 8 Drawing Figures

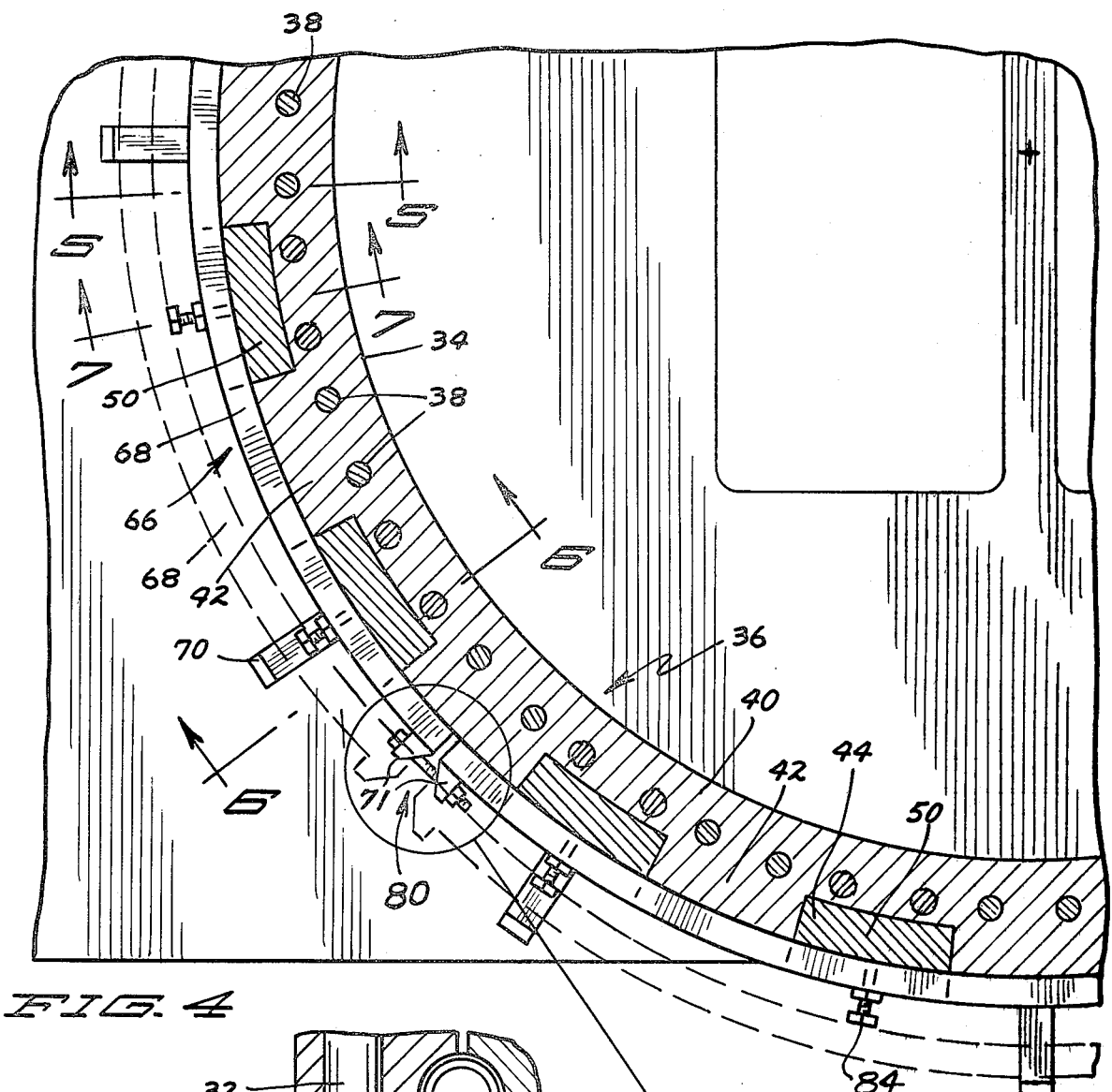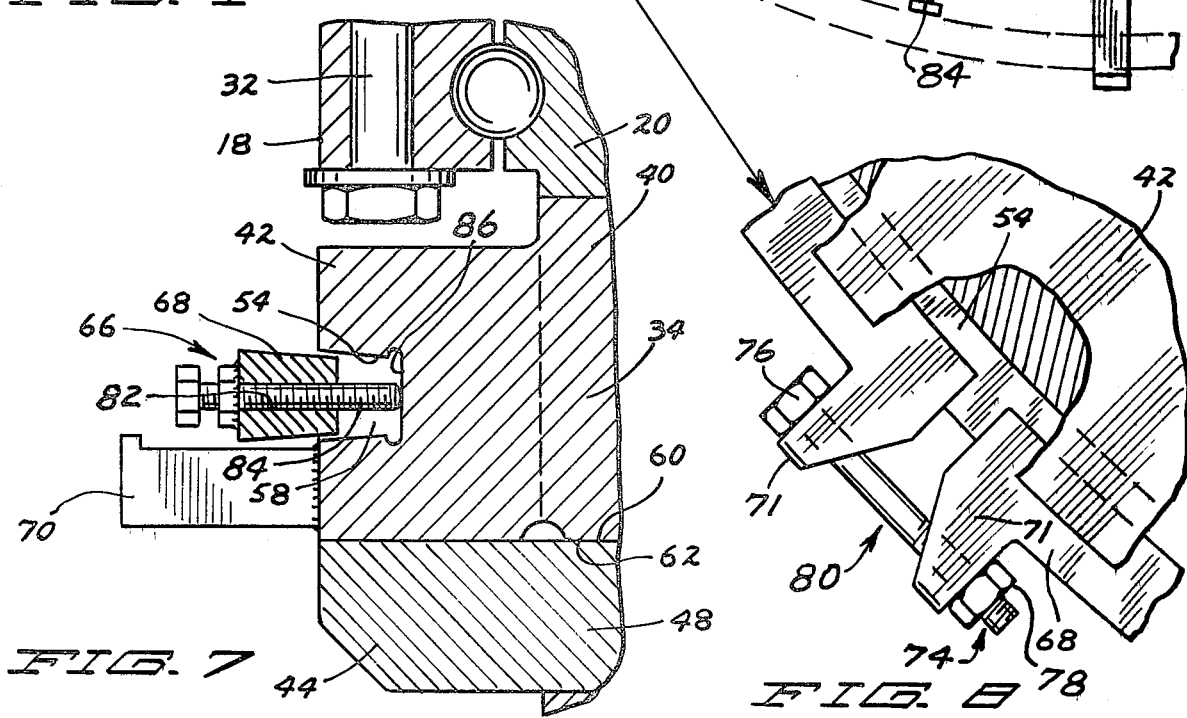

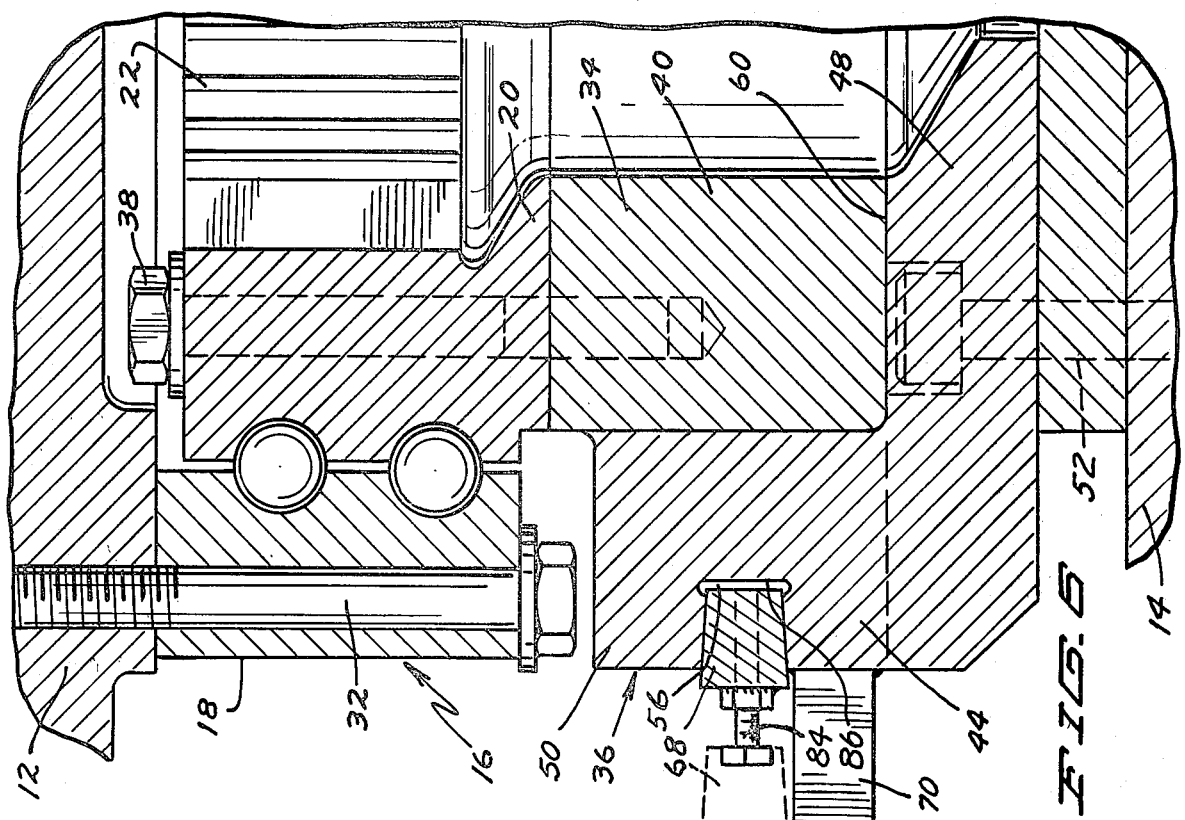
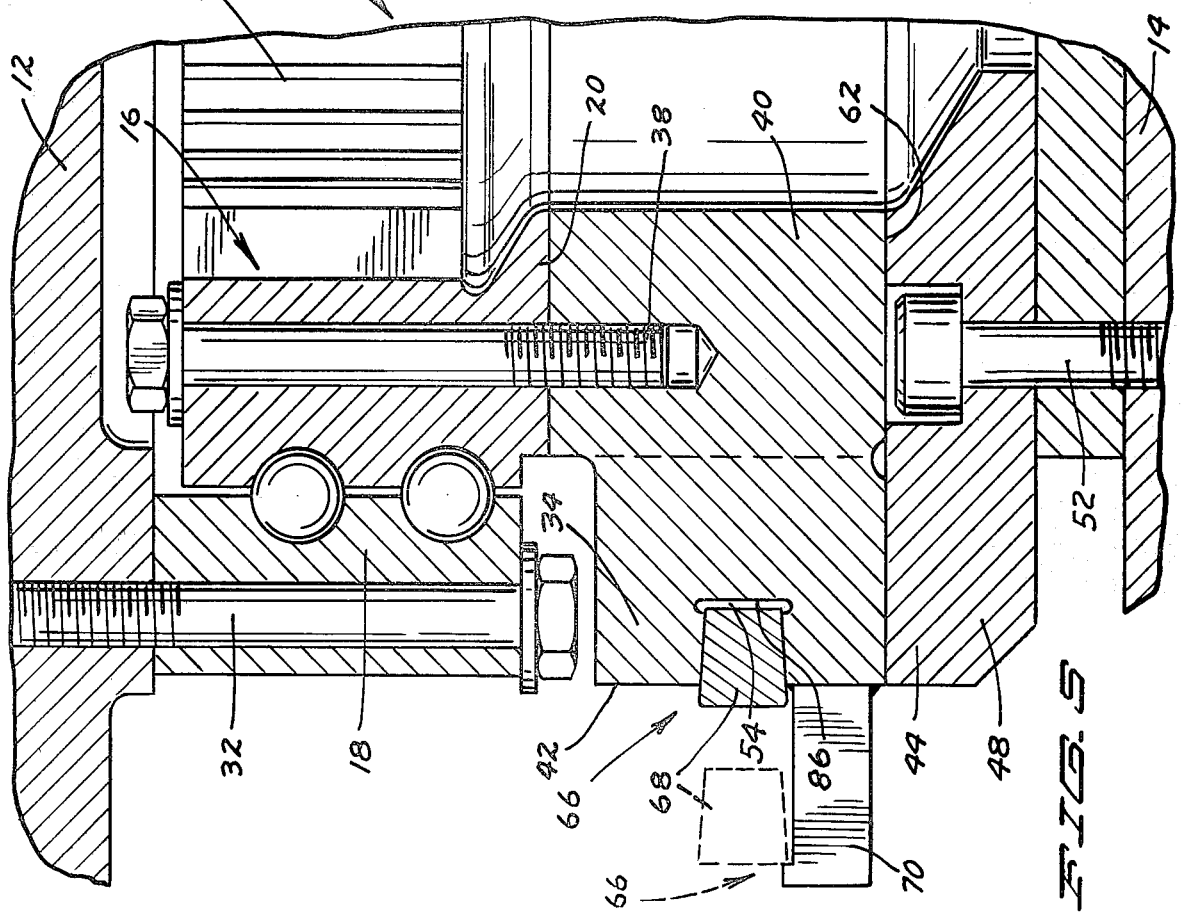

SWING BEARING QUICK REMOVAL SYSTEM

BACKGROUND OF THE INVENTION

1. Field of the Invention

This invention has relation to cranes having upper works rotatably supported on lower works and more specifically to quick removal and assembly structures for allowing rapid disassembly of the upper works from the lower works preparatory to transporting the crane from one work location to another and for allowing quick assembly of the upper works back onto the lower works upon arrival of the disassociated parts of the crane at the new location for use.

2. Description of the Prior Art

Before the advent of quick removal and assembly structures, anti-friction bearings rotatably supported and connected cranes upper works to their lower works. For example, an outer race of such an anti-friction bearing was bolted to an upper works using a plurality of extremely heavy bolts and nuts of great strength and size which had to be torqued up very accurately and tightly, and the inner race was bolted to the lower works using similar bolts. In order to disassemble the upper works from the lower works, one or the other sets of these bolts and nuts had to be removed. This was time consuming and costly, because the bolts have to be thrown away after one use. This is necessary because each bolt loses a substantial amount of its strength after having been fully torqued up. For example, after having been torqued up five times, the bolt strength is less than 30% of its original.

The expired patent to Bargmann, U.S. Pat. No. 3,061,389, granted Oct. 30, 1962, illustrates the prior art. Power crane platform or upper works 1 is affixed to an outer race 8,9 by a plurality of nut and bolt assemblies 14 while supporting platform or lower works 2 is bolted to an inner race 7 of an anti-friction bearing by a plurality of nut and bolt assemblies 12. To disassemble upper works 1 from lower works 2, either all of the nut and bolt assemblies 14 must be removed, or, more likely, all of the nut and bolt assemblies 12 must be removed. This latter procedure will allow the entire anti-friction bearing to be removed from the lower works 2 long with the upper works 1. After the crane sections or works have been transported to the new location for use, the upper works had to be lowered toward the lower works, and the bolt holes in the inner race 7 had to be lined up with the bolt holes in the lower works 2 before brand new nut and bolt assemblies 12 could be installed. It is to overcome this costly and time consuming procedure that quick removal and assembly structures have been developed.

It is well known to have circumferentially and concentrically spaced teeth extending downwardly from a crane upper works arranged to interdigitate with circumferentially and concentrically spaced teeth extending upwardly from the lower works of a crane, and to provide some means of locking these teeth with respect to each other to firmly, fixedly, but temporarily lock the upper works with respect to the lower works so that the crane can be used for its intended purpose.

For example, in the patent to Petrik et al, U.S. Pat. No. 3,921,817, an upper works of a crane is supported on an anti-friction bearing which has an outer race member secured to a lower works. The inner race member of the bearing surrounds a mounting ring which depends from the upper works. The upper works mounting ring and the inner race members have teeth which can move past each other when the upper works is being assembled to the lower works. After being so assembled, when shifted in relative angular position, these teeth serve to lock the upper works to the lower works. When shifted to the original angular position, these teeth again are in clearing relation to other, and the upper works can be removed from the lower works. Power rams effect relative angular shifting of the toothed members with respect to each other.

Use of a clamping ring to fixedly position the interdigitated ends or fingers or teeth of interfitted members is shown in the expired patent to Gilbert, U.S. Pat. No. 2,710,763, granted on June 14, 1955, and in the expired patent to Troeger, U.S. Pat. No. 2,553,220, granted on May 15, 1951.

In the Gilbert patent, teeth or fingers 14 of a circumferential flange 9 secured to an engine casing 10 are adapted to mesh with teeth or fingers 15 of a circumferential flange member 16 secured to a housing 18. A clamp ring 8 fits into mutually aligned external grooves 20 and 21 in these teeth to lock the flanges with respect to each other. Also, circumferential grooves 23 and 24 are provided on the inner circumference of the teeth 14 and 15, respectively, and a resilient split ring 27 having a free diameter slightly larger than the inner diameter of grooves 23 and 24 is utilized to temporarily hold the teeth 14 and 15 in mesh until the clamp ring 8 can be secured in position.

Similarly, in the Troeger patent, "a resilient ring-like element or split ring 44" locks teeth 22 and 24 together by fitting into recesses 34 and 36 provided in those teeth.

It is also known to support upper works fixedly but temporarily with respect to lower works by providing a downwardly extending cylindrical mounting ring on an upper works to be received into an upwardly extending cylindrical mounting ring on the lower works, and then locking the two together through the use of opposing circumferential grooves in the mounting rings.

For example, in the patent to Jensen et al, U.S. Pat. No. 3,923,407, granted Dec. 2, 1975, the inner race member of an anti-friction bearing which is rotatably mounted with respect to a lower works receives an upper mounting ring which is mounted on an upper works. Opposing circumferential grooves in the mounting ring and the inner face member receive a locking ring which is expanded and contracted by a power actuator mounted with respect to the upper works. When the locking ring bridges the grooves, the upper works is locked to the lower works. When the locking ring is contained entirely in the groove of the upper mounting ring, the crane upper works is released from the lower works for separation of the works from each other.

A similar structure is shown in the expired to Eaton, U.S. Pat. No. 2,877,732, which shows intermeshing "mounting rings" or axially aligned tubular sections 12 and 13 having aligned opposing circumferential grooves or channels 16 and 17, respectively. A locking ring or expansible split ring 20 is disposed within the channels 16 and 17 when sections 12 and 13 are locked to each other. When the locking ring 20 is entirely within the groove or channel 16, the sections 12 and 13 can be removed from each other.

The patent to Hanes et al, U.S. Pat. No. 3,521,911, discloses another form of locking ring to be positioned entirely within one of two mating grooves when the two telescoped cylindrical elements of the device are unlocked and to bridge the gap between these two mating grooves when the device is to be locked.

The patents cited above and the patents listed immediately below include all of the prior art located in a search of the prior art and include other patents which were cited as references in the patents located in the search. The patents listed below are not believed to be particularly pertinent to the invention.

| U.S. Pat. Nos. | | |
|---|---|---|
| 1,052,439 | Crosby | February 4, 1913 |
| 1,473,935 | Horton | November 13, 1923 |
| 3,844,127 | Koop, Jr. et al | October 29, 1974 |
| 3,888,357 | Bauer et al | June 10, 1975 |

Neither the inventor nor those in privity with him are aware of any prior art which is closer than that discussed above nor of any prior art which anticipates the claims herein.

SUMMARY OF THE INVENTION

A crane has an upper works rotatably supported on a lower works by an anti-friction bearing having inner and outer races. A structure for quickly removing the upper works from and for assembling the upper works to the lower works includes an upper mounting ring and a lower mounting ring. In the form of the invention shown, the upper mounting ring is fixedly mounted to an inner race of the anti-friction bearing, the outer race of that bearing being fixedly mounted to the upper works; and the lower mounting ring is fixedly mounted to the lower works. In other forms of the invention, the inner race could be connected to the upper works and the outer race connected to the upper mounting ring; or one of the races could be connected to the lower works with the other race being connected to the lower mounting ring, the upper mounting ring being connected to the upper works.

As shown, each mounting ring has a solid toroidal portion and a plurality of teeth extending away from the toroidal portion. Each tooth has a radially outwardly opening horizontal slot therein. The teeth of the upper and lower mounting rings are so shaped and so positioned that the upper teeth nest into the lower teeth so that the upper ring is supported on the lower ring when the upper works is assembled to the lower works. As shown, with the mounting rings so assembled and positioned, there can be no angular motion of the works with respect to each other.

The slots in the upper and lower teeth, when the works are assembled together, define a horizontal retaining ring groove. A retaining ring constituted as a plurality of retaining ring segments is of configuration to fit into this retaining ring groove. When so positioned, the retaining ring prevents relative axial movement of the mounting rings with respect to each other.

Releasable retaining ring securing means are provided to act on every adjacent pair of end portions of all of the retaining ring segments to draw those segments toward each other and simultaneously radially inwardly into the retaining ring groove. The crane will operate in its intended manner when the mounting rings and the retaining ring so positioned.

When the upper works is to be separated from the lower works, as, for example, when the crane is to be transported from one location for use to another, the releasable retaining ring means will be released, and ring segment release means is then used to forceably withdraw each retaining ring segment from the retaining ring groove. In the form of the invention as shown, the retaining ring segment release means includes a plurality of segment removal bolts each rotatably and threadably mounted with respect to one of said retaining ring segments and each extending through a horizontal bolt opening in its segment in position to bear against an upright inner tooth slot wall defining part of the retaining ring groove. Manual rotation of each bolt can tend to force its retaining ring segment out of the groove.

A plurality of retaining ring support arms can extend integrally outwardly from the teeth of one of said mounting rings at position immediately below the tooth slots in those teeth and in position to support the retaining ring segments after they have been removed entirely from the retaining ring groove. After the upper works has been removed from the lower works, the retaining ring segments can be replaced in that portion of the retaining ring groove formed by the teeth on the lower mounting ring, for example, and the retaining ring securing means can again be utilized, this time to draw the retaining ring segments into that part of the retaining ring groove formed by the slots in the teeth of the lower mounting ring to tend to protect the retaining ring segments, the lower mounting ring teeth and the portion of the retaining ring groove defined by those lower mounting ring teeth.

BRIEF DESCRIPTION OF THE DRAWINGS

FIG. 4 is an enlarged fragmentary horizontal sectional view taken on the line 4—4 in FIG. 2;

FIG. 5 is an enlarged fragmentary vertical sectional view taken on the line 5—5 in FIG. 4;

FIG. 6 is an enlarged fragmentary vertical sectional view taken on the line 6—6 in FIG. 4;

FIG. 7 is an enlarged fragmentary vertical sectional view taken on the line 7—7 in FIG. 4; and FIG. 8 is an enlarged fragmentary horizontal plan view with parts broken away taken on the line 8—8 in FIG. 2.

DETAILED DESCRIPTION OF THE PREFERRED EMBODIMENTS

Figure 1:
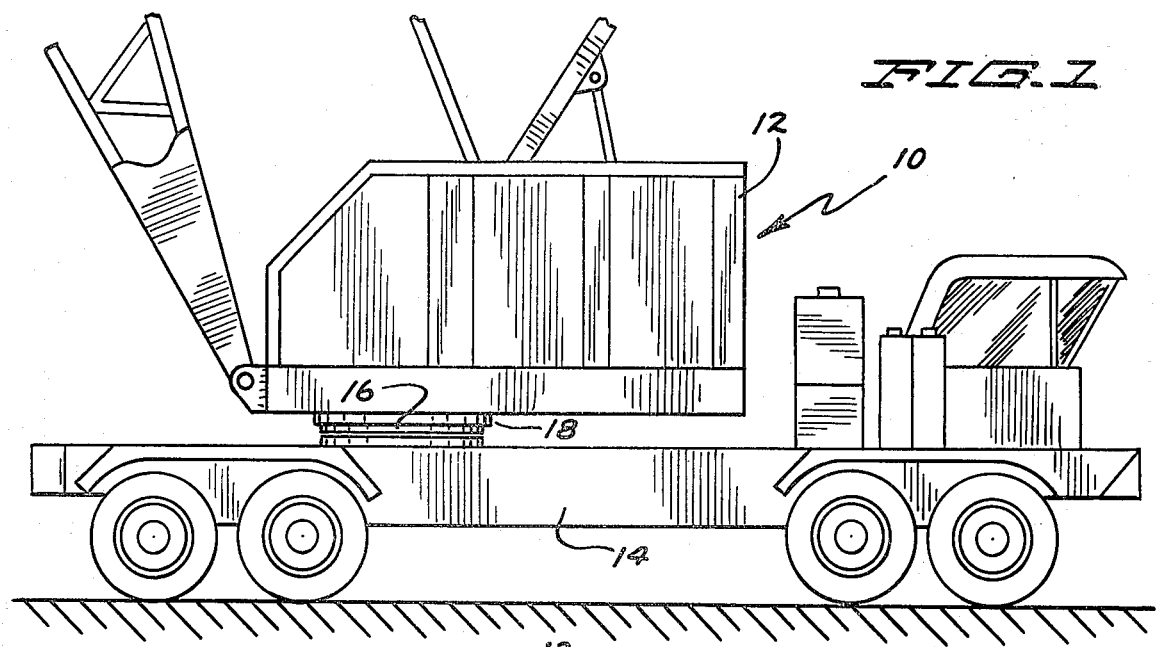
FIG. 1 is a side elevational view of a crane utilizing the quick removal and assembly structure of the invention.
Figure 2:
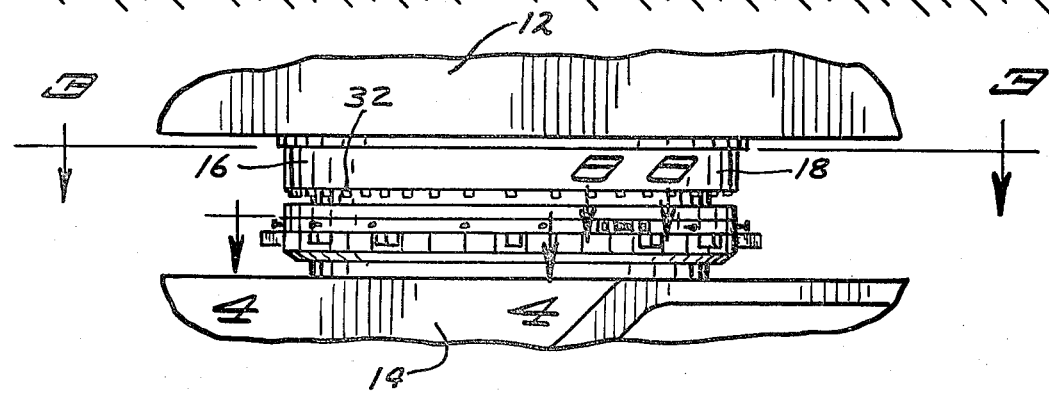
FIG. 2 is an enlarged fragmentary elevational view of portions of the upper works and lower works in relationship to an anti-friction bearing and the removal and assembly structure of the invention as seen from the back side of FIG. 1.
Figure 3:
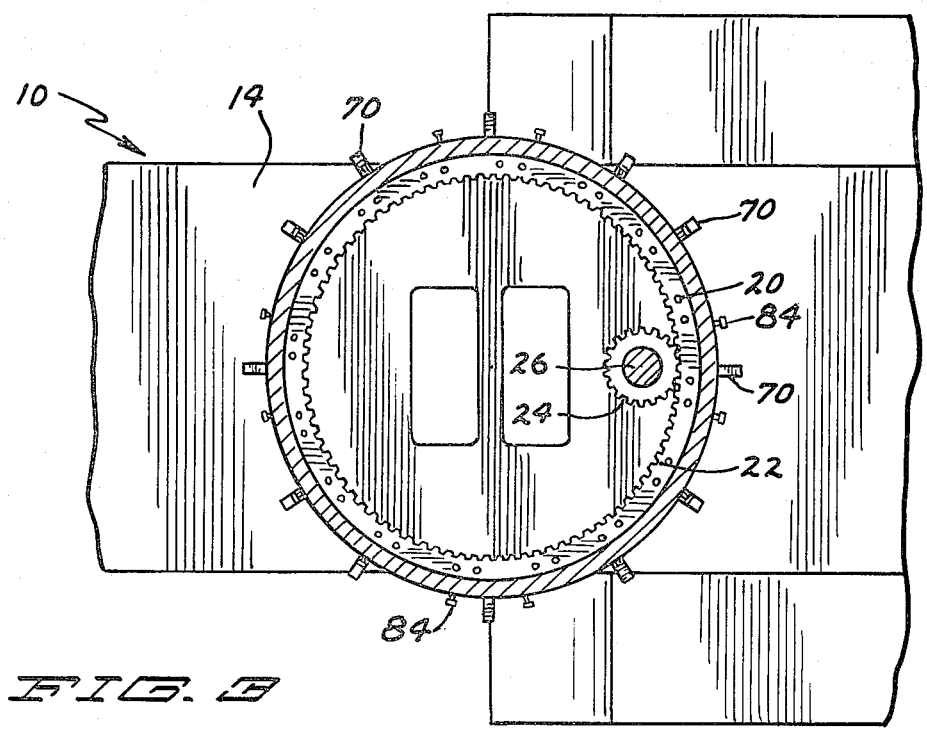
FIG. 3 is a horizontal sectional view taken on the line in 3—3 in FIG. 2.

A crane 10 includes an upper works 12 and a carrier or lower works 14 rotatably supported with respect to each other by an anti-friction swing bearing 16 having an outer race 18 and an inner race 20. The inner race 20 of this swing bearing integrally includes an internal bull or circle gear 22. As best seen in FIG. 3, a swing drive pinion 24 meshes with the circle gear 22 and is supported on a pinion drive shaft 26 which is rotatably mounted with respect to the upper works and is driven by machinery on the machinery deck of the upper works in any usual or preferred manner (not shown).

In the form of the invention shown, outer race 18 of swing bearing 16 is fixedly mounted to the underside of the upper works 12 through the instrumentality of upper mounting bolts 32. Inner race 20 of the bearing is fixedly mounted to an upper mounting ring 34 of a quick removal and assembly structure 36 through the instrumentality of middle mounting bolts 38. Upper mounting ring 34 includes a solid toroidal portion 40 into which the bolts 38 are threadably mounted, and includes a plurality of upper mounting ring teeth 42 extending horizontally away from the toroidal portion.

A lower mounting ring 44, also forming part of the quick removal and assembly structure 36 includes a solid toroidal portion 48 and a plurality of lower mounting ring teeth 50 extending upwardly away from the toroidal portion. The lower mounting ring is fixedly mounted to the lower works 14 through the instrumentality of lower mounting bolts 52.

In other forms of the invention, without deviating from the spirit of the invention or the scope of the claims which follow, the inner race could be bolted directly to the lower works, the upper mounting ring bolted directly to the upper works, and the outer race bolted to the lower mounting ring; or the outer race of the swing bearing could be bolted to the lower works or lower mounting ring while the inner race could be bolted to the lower mounting ring or the lower works.

As best seen in FIG. 4, the configuration and positioning of the upper mounting ring teeth 42 and the lower mounting ring teeth 50, when the upper works is assembled to the lower works, is such that each tooth of each mounting ring is nested snugly against two of the other teeth of the other mounting ring, thus firmly holding the mounting rings against any possibility of angular rotation of either with respect to the other.

Each of the upper mounting ring teeth 42 is provided with a slightly inwardly tapering horizontal outwardly opening slot 54 therein; while each of the lower mounting ring teeth 50 is provided with a slightly inwardly tapering, horizontal, outwardly opening slot 56 therein. When the upper works is assembled to the lower works, these slots 54 and 56 define a complete circumferential horizontal retaining ring groove 58.

In the form of the invention shown, when the upper works 12 is assembled to the lower works 14, the weight of the upper works is carried on an upper plane surface 60 of the toroidal portion 48 of the lower mounting ring 44 in contact with a lower plane surface 62 of the solid toroidal portion 40 of the upper mounting ring 34.

Also a part of the quick removal and assembly structure is a retaining ring 66 constituted as four retaining ring segments 68 in the form of the invention as shown. A lesser or greater number of segments could be effectively utilized. Each segment is tapered slightly inwardly and is of configuration to fit snugly and firmly in the horizontal retaining ring groove in intimate contact with the tapered upper and lower walls of each of the slots 54 and 56 in each of the teeth 42 and 50, respectively. When first the upper works is assembled to the lower works, each retaining ring sement 68 will be supported on two or more retaining ring support arms 70, each of said support arms extending integrally outwardly from one of the sets of teeth 42 or 50 at position just below the bottom surface of the retaining ring groove 58.

Each ring segment has a pair of ring segment securing end brackets 71,71 one extending horizontally radially outwardly from each end of the ring segment. Each end bracket 71 has a bolt hole therethrough in spaced relationship to the ring segment for receiving a nut and bolt assembly 74 constituted, in the form of the invention as shown, as a ring segment securing bolt 76 and a ring segment securing nut 78.

To secure the upper works to the lower works, each retaining ring segment 68 is manually positioned within its portion of the horizontal retaining ring groove 58 in immediately adjacent relationship to two of the other segments. The now immediately adjacent ring segment securing end brackets 71, and a ring segment securing nut and bolt assembly 74 together make up a retaining ring splice assembly 80.

Each retaining ring segment 68 is provided with at least two horizontally extending segment removal bolt openings 82 therethrough, and each such opening has a segment removal bolt 84 extending through it and threadably rotatably mounted with respect to its ring segment 68.

With the ring segments being manually positioned as far into the retaining ring groove 58 as is convenient, each retaining ring splice assembly 80 is assembled by inserting a ring segment securing bolt 76 through the bolt holes in adjacent ring segment securing end brackets 71,71 and assembling a ring securing nut 78 onto each such bolt. With the segment removal bolts 84 all backed off so they do not extend out beyond their ring segments 68, the ring segments securing nuts 78 are turned onto the securing bolts 76 to shorten the retaining ring 66 and to cause each segment 68 of the ring to be drawn into the retaining ring groove 58. When the retaining ring 66 and its segments 68 arrive at the positions as illustrated in FIGS. 5 and 6, the upper works 12 will be precisely aligned with and fixedly mounted with respect to the lower works 14. The crane can now be operated in its intended manner.

When it is desired to quickly disassemble the upper works from the lower works, the retaining ring splice assembly 80 will be disassembled by removing the ring segment securing nuts 78 from their securing bolts 76, and removing the securing bolts from the bolt openings in the end brackets 71. The ring segments 68 will then be withdrawn from the retaining ring groove 58 by rotating the segment removal bolts 84 to force them against a vertical inner tooth slot wall 86 which partially defines each of the mounting ring tooth slots 54 and 56.

When each of the ring segments 68 has been so removed from the retaining ring groove 58, it will take position once again on at least two of the retaining ring support arms 70. The upper works 12 can now be lifted vertically and so removed from the lower works 14.

Assuming that the retaining ring support arms 70 are integral with and extend outwardly from the lower ring mounting teeth 50, once the upper works 12 has been removed, the retaining ring segments 68 can be once again inserted into the horizontal, outwardly opening slots 56 in the lower ring mounting teeth. The retaining ring splice assemblies can be reassembled to install and maintain the retaining ring 66 in the teeth 50 after the segment removal bolts 84 have been backed off, and the lower works can be transported to the next location for use with the retaining ring segments 68 and the lower mounting ring teeth 50 mutually protecting each other and protecting the retaining ring 66 against damage during the move.

What is claimed is:

1. In a crane having an upper works rotatably supported on a vertical axis on a lower works by an anti-friction bearing having inner and outer races, a quick removal and assembly structure, said structure including:
   an upper mounting ring and a lower mounting ring;
   one of said mounting rings being integrally mounted with respect to a first of said works, the other ring being concentrically and integrally mounted with respect to a first of said bearing races, and a second of said bearing races being integrally mounted with respect to a second of said works;
   said upper mounting ring having a solid toroidal portion and a plurality of teeth extending away from the toroidal portion, each tooth having a radially outwardly opening horizontal slot therein;
   said lower mounting ring having a solid toroidal portion and a plurality of teeth extending away from the toroidal portion, each tooth having a radially outwardly opening horizontal slot therein;
   said upper and lower mounting rings being so shaped and said upper and lower teeth being of configuration so that the upper and lower ring teeth nest with each other and the upper ring is supported on the lower ring when said upper works is assembled to the lower works;
   the slots in the upper and lower teeth together defining a horizontal retaining ring groove in said teeth when said works are so assembled;
   a retaining ring constituted as a plurality of retaining ring segments of configuration to fit into said upper and lower ring teeth defined retaining ring groove to prevent relative movement of said upper and lower mounting rings with respect to each other;
   releasable retaining ring securing means operative on every adjacent pair of end portions of all of the retaining ring segments to draw said segments toward each other and simultaneously radially inwardly into said retaining ring groove; and
   positive ring segment release means operable to forceably completely withdraw each retaining ring segment radially outwardly from said retaining ring groove when said retaining ring securing means has been released.

2. The quick removal and assembly structure of claim 1 wherein:
   at least some of said mounting ring teeth are provided with upright inner tooth slot walls at least partially defining said retaining ring groove;
   each retaining ring segment is provided with a plurality of horizontally extending segment removal bolt openings therethrough; and
   said retaining ring segment release means includes a plurality of segment removal bolts, each rotatably and threadably mounted with respect to the segment and each extending through one of its bolt openings in position to bear against one of the upright inner tooth slot walls of the retaining ring groove so that manual rotation of each segment removal bolt can tend to force its retaining ring segment radially out of the retaining ring groove.

3. The quick removal and assembly structure of claim 2 wherein:
   a plurality of retaining ring support arms each extend integrally outwardly from one of a plurality of teeth of one of said upper or said lower mounting rings in position just below the tooth slots, there being sufficient support arms so positioned to support in a stable condition each of the retaining ring segments when such segments are removed completely from all of the tooth slots.

* * * * *